United States Patent
Nambu et al.

(10) Patent No.: US 6,596,824 B2
(45) Date of Patent: Jul. 22, 2003

(54) METHOD FOR PRODUCING POLYOLEFIN AND GAS PHASE POLYMERIZATION APPARATUS

(75) Inventors: Tomoo Nambu, Ichihara (JP); Masao Aida, Ichihara (JP); Masatoshi Toda, Ichihara (JP)

(73) Assignee: Idemitsu Petrochemical Co., Ltd., Tokyo (JP)

(*) Notice: Subject to any disclaimer, the term of this patent is extended or adjusted under 35 U.S.C. 154(b) by 0 days.

(21) Appl. No.: 09/926,543

(22) PCT Filed: Mar. 15, 2001

(86) PCT No.: PCT/JP01/02055
§ 371 (c)(1),
(2), (4) Date: Nov. 16, 2001

(87) PCT Pub. No.: WO01/68717
PCT Pub. Date: Sep. 20, 2001

(65) Prior Publication Data
US 2003/0060576 A1 Mar. 27, 2003

(30) Foreign Application Priority Data
Mar. 16, 2000 (JP) .......................... 2000-073536

(51) Int. Cl.$^7$ .............................. C08F 2/40; B01J 8/18
(52) U.S. Cl. ............................ 526/82; 526/83; 526/84; 526/85; 526/901; 525/53; 525/244; 525/255; 525/258; 525/259; 525/261; 525/262; 525/323; 422/131; 422/135; 422/139
(58) Field of Search .............................. 526/82, 83, 84, 526/85, 901; 422/135, 139, 131; 525/323, 244, 255, 258, 259, 261, 262, 53

(56) References Cited

U.S. PATENT DOCUMENTS

| | | | | |
|---|---|---|---|---|
| 5,066,736 A | * | 11/1991 | Dumain et al. | ................ 526/82 |
| 6,013,741 A | * | 1/2000 | Ohtani et al. | ............. 526/82 X |
| 6,359,084 B1 | * | 3/2002 | Herzog et al. | ............ 526/82 X |

FOREIGN PATENT DOCUMENTS

| JP | 11-106409 | 4/1999 |
|---|---|---|
| JP | 2000-86733 | 3/2000 |

OTHER PUBLICATIONS

ACS Abstract 1999:250292 of Japanese Pat. No. 11106409, published Apr. 1999.*

* cited by examiner

*Primary Examiner*—Fred Teskin
(74) *Attorney, Agent, or Firm*—Oblon, Spivak, McClelland, Maier & Neustadt, P.C.

(57) ABSTRACT

Provided is a continuous vapor-phase polymerization method for producing polyolefins. In the method, polymer agglomerates and aggregates are prevented from being formed, and polymer deposition on the wall of reactors and around stirring blades is prevented. The method enables continuous and stable production of high-quality polyolefins, with no pipe line clogging. The method is characterized by a specific supply mode of feeding a catalyst activity retardant such as alcohol into polymerization reactors. Specifically, the retardant is fed into the vapor phase in a polymerization reactor and into the powder phase therein through its side wall. Preferably, the retardant is fed into the powder phase through a plurality of sites of the side wall of the reactor.

15 Claims, 1 Drawing Sheet

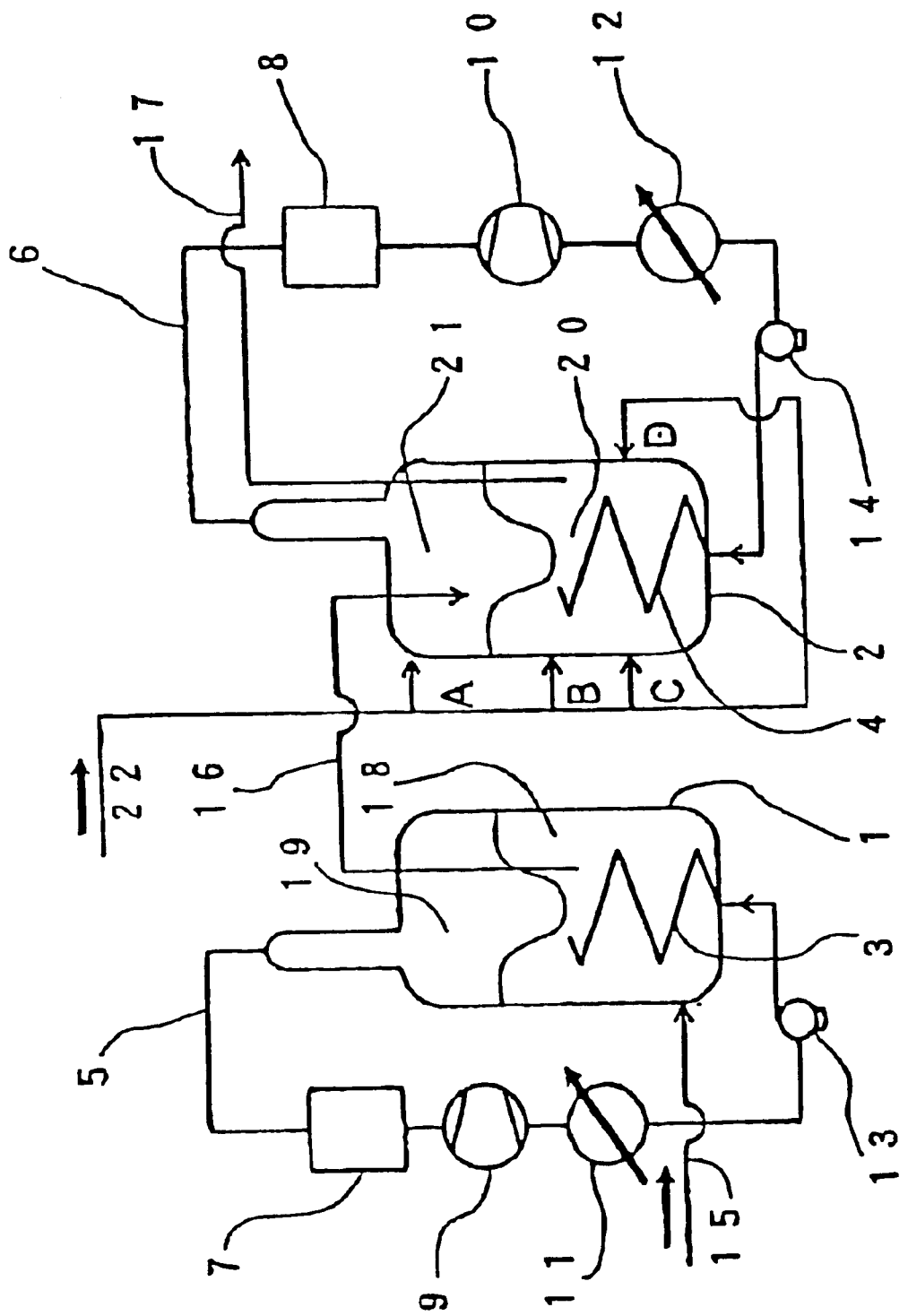

METHOD FOR PRODUCING POLYOLEFIN AND GAS PHASE POLYMERIZATION APPARATUS

TECHNICAL FIELD

The present invention relates to a method for producing polyolefins, especially propylene block copolymers, and to the production method and a vapor-phase polymerization apparatus for it, in which olefins are polymerized in a mode of vapor-phase polymerization in the presence of an olefin polymerization catalyst, with preventing the polymers produced from depositing in reactors and preventing them from growing into abnormal agglomerates or aggregates, and which therefore ensure long-term continuous and stable production of high-quality polyolefins.

BACKGROUND ART

For the production of polyolefins such as polypropylene and propylene block copolymers, Ziegler-Natta catalysts have been improved to have high activity and high stereospecificity, and the polymer productivity per the unit catalyst used has been greatly increased with the increase in the stereospecificity of the polymers produced. As a result, it has become possible to reduce the metal content such as the catalyst-derived transition metal content of the polymers produced and to reduce the amorphous polypropylene content thereof. Accordingly, for the polymer production method, a mode of vapor-phase polymerization is now increasingly popular in place of conventional solution polymerization, slurry polymerization and bulk polymerization, as it does not require solvent recovery and purification, it facilitates monomer recovery and polymer drying, and it realizes product diversification.

For example, propylene block copolymers are produced in a two-stage process comprising producing a crystalline homopolymer or copolymer of propylene in the former stage polymerization reactor, followed by producing a rubber-like random copolymer of propylene and other α-olefins such as ethylene in the latter stage polymerization reactor. The propylene block copolymer compositions produced have high mechanical strength, good toughness and good heat resistance intrinsic to the crystalline polypropylene, and have good impact resistance, especially good low-temperature impact resistance intrinsic to the rubber-like random copolymer. Therefore, they are widely used for automobile parts including outer members such as bumpers and inner members such as inner panels and doors, and for containers, sheets, etc.

Accordingly, the method of vapor-phase polyolefin production is an extremely excellent process. In the vapor-phase method, however, the polymer produced is separated into a powder phase and a vapor phase in the polymerization reactor of any type having a vapor-phase fluidized bed or an agitation fluidized bed, and therefore, the polymer in the reactor could not be fully fluidized, stirred and unified. Therefore, when compared with that produced in a method of solution polymerization or slurry polymerization, stirring and unifying the polymer produced in the vapor-phase polymerization method is often unsatisfactory. In particular, in the vapor-phase polymerization method of producing propylene block copolymers mentioned above, the rubber-like copolymer produced in the second-stage random copolymerization reactor is sticky, and the polymer and copolymer particles often agglomerate or aggregate and often deposit on the wall of the reactor and on the stirring blades in the reactor.

The polymer deposition interferes with stable, long-term continuous polymerization in the reactor, and, in addition, causes excessive increase in the molecular weight of the polymer produced, and, as the case may be, the polymer is often gelled in the reactor. As a result, the quality of final polymer moldings will be low. Still another problem is that small polymer agglomerates having deposited on the wall of the reactor often clog pipe lines of polymer powder. In addition, they will clog filters in monomer-cooling pipe lines. For these reasons, the quality of final polymer moldings is worsened to the following effect. The polymer having deposited on the wall of a reactor stays in the polymerization line for a long period of time and is gelled to be a nonmelting or hardly melting matter. This worsens the appearance of the moldings of the polymer produced in the line, and will be the start point of the fracture of the moldings. After all, the physical properties and the commercial value of the moldings are much lowered.

Accordingly, polymer deposition and agglomeration must be prevented in the process of producing polyolefins, especially propylene block copolymers. For this, Japanese Patent Laid-Open Nos. 151713/1981 and 213012/1983 disclose a method of adding an alkoxyaluminium compound to the polymerization system. In this, however, the alkoxyaluminium compound is not effective if its amount added is not large. Since the aluminium content of the polymer produced therein increases, the method is unfavorable for vapor-phase polymerization.

Japanese Patent Laid-Open No. 69821/1986 discloses a method of using a high-stereospecificity polymerization catalyst, in which from 0.001 to 1 mol, per gram of aluminium of the catalyst, of an active hydrogen compound is fed into the random copolymerization system. However, the method disclosed is for batch polymerization, and not for continuous polymerization. The laid-open specification shows a concrete mode of feeding an active hydrogen compound to the random copolymerization system and says that the bulk density of the polymer produced is high. In this, however, nothing is referred to about the prevention of polymer deposition in reactors. This is natural since the batch polymerization employed therein produces uniform polymers.

On the other hand, Japanese Patent Laid-Open Nos. 225613/1988, 296313/1992, 296314/1992 and 71415/1999 relate to vapor-phase polymerization, and concretely disclose how to feed an alcohol into the monomer-cooling pipe line and into the polymer-transferring pipe line that connects a crystalline polypropylene-producing polymerization reactor and a propylene random copolymer-producing polymerization reactor. In these, however, the olefin polymerization catalyst activity retardant is not directly fed into the polymerization reactors. In the methods disclosed, the catalyst activity retardant is added to the polymerization system by feeding it into the polymer powder pipe line or into the monomer pipe line, to thereby improve the dispersibility of the polymer produced. Anyhow, in these, the catalyst activity retardant is finally added to the polymerization reactors, and the methods will be good.

In Japanese Patent Laid-Open No. 71415/1999, disclosed is an example of metering and feeding a heptane solution of 17 wt. % isopropanol into a pipe line that connects two reactors, former-stage and latter-stage reactors. In this, also disclosed is a comparative example of metering and feeding the same solution directly into the latter-stage reactor. In these example and comparative examples, the systems were driven for 3 weeks, and then compared with each other. They say that the amount of the agglomerates and the aggregates seen in the powder bed in the latter-stage reactor in the method of the example was reduced to 35 to 45% of that in the comparative example; and the amount of the films and the deposits on the reactor wall and on the baffles was reduced to 25 to 35% of that in the comparative example.

To that effect, the conventional improved methods could produce good results in some degree. In Japanese Patent Laid-Open No. 71415/1999, the effect of reducing the polymer agglomeration, aggregation and deposition is quantitatively evaluated. However, even though the method disclosed therein is improved in some degree, it is obvious that its effect of reducing the polymer agglomeration, aggregation and deposition is limited and is not always satisfactory. Therefore, depending on the type of the polymerization reactors used and the polymerization conditions employed, non-negligible polymer agglomerates and aggregates are formed in the method and they deposit on the reactor wall and on the stirring blades, thereby often clogging the polymer take-out pipes. The problem with the method must be solved.

The present invention is to solve the problems with the related art techniques as above, and its object is to provide a method for producing polyolefins through continuous vapor-phase polymerization in the presence of an olefin polymerization catalyst, and a vapor-phase polymerization apparatus for the method free from the problem of non-uniformity in vapor-phase polymerization. Specifically, in the vapor-phase polyolefin production method of the invention, the (co)polymer produced does not form agglomerates and aggregates, and does not deposit on the reactor wall and on the stirring blades, and abnormal reaction products and large particles are prevented from being formed therein. Therefore, in the method, the filters and the pipe lines are not clogged, and the method ensures stable, long-term continuous polymerization, with no abnormal polymerization to lower the quality of the polymers produced.

DISCLOSURE OF THE INVENTION

To attain the object as above, we, the present inventors have assiduously studied the relationship between the mode of feeding a catalyst activity retardant to the polymerization system and the polyolefin polymer deposition in reactors and around stirring blades and the formation of abnormal polymer agglomerates and aggregates. As a result, we have found that the mode of feeding a catalyst activity retardant to polymerization reactors has a significant influence on the polymer deposition in the reactors and around the stirring blades and also on the formation of abnormal polymer agglomerates and aggregates, thereby often lowering the polymer productivity and worsening the polymer product quality. On the basis of these findings, we have completed the present invention.

Specifically, the invention provides the following:

(1) A method for producing polyolefins through continuous vapor-phase polymerization in the presence of an olefin polymerization catalyst, which is characterized in that a catalyst activity retardant is fed into the vapor phase in the polymerization reactor and into the powder phase therein through its side wall.

(2) The method for producing polyolefins of above (1), wherein the catalyst activity retardant is fed into the powder phase through a plurality of openings in the side wall of the polymerization reactor.

(3) The method for producing polyolefins of above (1) or (2), wherein the plurality of openings in the side wall of the polymerization reactor through which the catalyst activity retardant is fed into the powder phase are both in the upper and lower parts of the reactor and are spaced from each other in the peripheral direction of the side wall.

(4) The method for producing polyolefins of any of above (1) to (3), wherein the amount of the catalyst activity retardant fed into the polymerization reactor falls between 0.001 and 5 g per kg of the polyolefin produced, and the ratio of the catalyst activity retardant fed into the vapor phase in the reactor to that into the powder phase therein falls between 95/5 and 10/90 by weight.

(5) The method for producing polyolefins of any of above (1) to (4), wherein the catalyst activity retardant is fed into the polymerization reactor along with a carrier fluid.

(6) The method for producing polyolefins of any of above (1) to (5), wherein the catalyst activity retardant is at least one selected from alcohols, phenols, carboxylic acids, sulfonic acids, amines, amides, esters, ethers, phosphines, water, carbon monoxide and carbon dioxide.

(7) The method for producing polyolefins of any of above (1) to (6), wherein the catalyst activity retardant is an active hydrogen-containing compound.

(8) The method for producing polyolefins of any of above (1) to (7), which comprises producing a crystalline polypropylene of either a propylene homopolymer or a propylene copolymer having an additional α-olefin content of at most 5% by weight in a first polymerization reactor, and producing a propylene block copolymer through random copolymerization of propylene and an α-olefin different from propylene in the presence of the crystalline polypropylene in a second polymerization reactor, and wherein the catalyst activity retardant is fed into the second polymerization reactor.

(9) A vapor-phase polymerization apparatus for polyolefins, which comprises a monomer supply line, a polymer take-out line, a monomer circulation line, and a polymerization reactor optionally with a stirrer therein, and which is equipped with a supply unit for feeding a catalyst activity retardant into the vapor phase in the polymerization reactor and into the powder phase therein through its side wall.

(10) The vapor-phase polymerization apparatus for polyolefins of above (9), wherein the catalyst activity retardant supply unit has a plurality of outlets that are directed to the powder phase in the polymerization reactor and are spaced from each other in the peripheral direction of the side wall of the reactor.

BRIEF DESCRIPTION OF THE DRAWING

FIG. 1 is a schematic view of one example of the apparatus for polyolefin production of the invention, in which the reference numerals are as follows: 1 is a former-stage polymerization reactor; 2 is a latter-stage polymerization reactor; 3 is a stirrer in the former-stage polymerization reactor; 4 is a stirrer in the latter-stage polymerization reactor; 5 is a circulation line fitted to the former-stage polymerization reactor; 6 is a circulation line fitted to the latter-stage polymerization reactor; 7 and 8 are filters; 9 and 10 are compressors; 11 and 12 are condensers; 13 and 14 are pumps; 15 is a monomer supply line; 16 is a polymer transfer line; 17 is a polymer take-out line; 18 is a powder phase in the former-stage polymerization reactor; 19 is a vapor phase in the former-stage polymerization reactor; 20 is a powder phase in the latter-stage polymerization reactor; 21 is a vapor phase in the latter-stage polymerization reactor; and 22 is a catalyst activity retardant supply line.

BEST MODES OF CARRYING OUT THE INVENTION

Embodiments of the invention are described herein under.

The invention is directed to general polyolefin production in a mode of continuous vapor-phase polymerization in the presence of an olefin polymerization catalyst. In particular, the invention is favorable to production of propylene block copolymers. The monomers to be used in polyolefin production in the invention are not specifically defined, including, for example, α-olefins such as ethylene, propylene, 1-butene, 1-pentene, 4-methyl-pentene-1,1-hexene, 1-octene, 1-nonene, and 1-decene. These α-olefins may be homopolymerized or copolymerized. If desired, they may form copolymers with any other copolymerizable monomers such as vinyl acetate and acrylic acid.

The olefin polymerization catalyst to be used in the polyolefin production method of the invention is not specifically defined, and may be any known one. Various types of olefin polymerization catalysts for ordinary vapor-phase polymerization are usable herein, including, for example, Ziegler-Natta catalysts that contain a solid catalyst component prepared from a tri-valent or tetra-valent titanium halide or alcoholate or an alkoxytitanium halide, and magnesium chloride or an alkoxymagnesium, and solid catalysts of which the catalyst component of a metallocene compound that contains, for example, a cyclopentadienyl group-having titanium, zirconium or hafnium compound is held on a carrier.

The catalyst may be combined with any known promoter, for example, an organoaluminium compound such as an alkylaluminium or aluminoxane, an ionic complex, or a Lewis acid, and even with an electron donor. Along with the catalyst, an electron-donating compound may be used in polymerization.

The vapor-phase polymerization reactor to be used in vapor-phase polyolefin production in the invention is not specifically defined, and may be any known one. For example, various types of reactors are shown in Chemical Apparatus, Vol. 41, pp. 62–74, 1999. Concretely mentioned for use herein are fluidized-bed polymerization reactors (for example, in Japanese Patent Laid-Open No. 234409/1992), vertical polymerization reactors equipped with a stirrer (for example, in Japanese Patent Laid-Open Nos. 123487/1978 and 23258/1979), and horizontal polymerization reactors equipped with a stirrer (for example, in Japanese Patent Laid-Open No. 223001/1988).

The polymerization reactor for use herein may be a single-stage or single-room reactor, or may also be a double-stage or more multi-stage reactor. In the vapor-phase polymerization reactor system of such types, in general, a solid catalyst and a monomer are continuously fed into the polymerization reactor, while the polymer particles produced are continuously taken out of the system at regular intervals or intermittently. The monomer gas in the polymerization reactor is taken out and liquefied in an external compressor or condenser, and the thus-liquefied monomer is sprayed into the polymerization reactor. In this system, the heat of polymerization is canceled by the latent heat of vaporization.

In particular, the method of the invention is favorable to polyolefin production in two or more polymerization reactors, generally in two polymerization reactors. In the two, or that is, in the former-stage polymerization reactor and the latter-stage polymerization reactors, polymers (copolymers) of different properties are produced. For example, a crystalline polyolefin is produced in the former-stage polymerization reactor, and a rubber-like random copolymer is produced in the presence of the crystalline polyolefin in the latter-stage polymerization reactor. Accordingly, a mixture composition of the two polyolefins is obtained in the two-stage polymerization system. The invention is favorable to it.

The polymerization mode in the two-stage polymerization system of the type includes polymerization to give polyolefins that differ in the molecular weight, (co)polymerization of different monomers, copolymerization to give copolymers that differ in the copolymerization composition, (co)polymerization to give (co)polymers that differ in the degree of crystallinity, and their combinations. In accordance with the intended polyolefins, any mode of polymerization may be effected in the two-state polymerization system.

The polyolefin production method of the invention is for producing a polyolefin through continuous vapor-phase polymerization in the presence of an olefin polymerization catalyst. In this, a catalyst activity retardant is fed into the polymerization reactor for stabilizing the monomer polymerization therein. The invention is characterized in that the catalyst activity retardant is fed into specific sites of the polymerization reactor.

Regarding the mode of catalyst activity retardant supply to polymerization systems, the conventional proposals are grouped into three types; <1> a method of feeding the retardant directly to the polymerization reactor, <2> a method of supplying the retardant to the polymer transfer line through which the polymer particles produced in the former-stage polymerization reactor is transferred into the latter-stage polymerization reactor, and <3> a method of feeding the retardant to the monomer circulation line in which the heat of polymerization generated in the polymerization reactor is removed, as so mentioned hereinabove. As a matter of form, the supply mode in the methods <2> and <3> is not for direct supply to polymerization reactors. In these methods, the catalyst activity retardant fed into the system will be diluted and unified by the polymer particles or the monomer, but it is sure that the retardant is indirectly fed into the polymerization reactor.

In view of the structure of the vapor-phase polymerization system employed in these methods <2> and <3>, the catalyst activity retardant fed into the polymer transfer line in the method <2> is to be led into the polymerization reactor through its top; and the catalyst activity retardant fed into the monomer circulation line in the method <3> is to be led into the polymerization reactor through its bottom. Accordingly, if the methods <2> and <3> are combined, a method <4> of the resulting combination will be better as the catalyst activity retardant is fed into the polymerization reactor through its two sites.

As a result of our studies, however, we, the present inventors have found that even the combination method <4> of retardant supply through two portions into the polymerization reactor is still unsatisfactory and could not attain the object of the invention. Though not clear, the reason will be because the amount of the catalyst activity retardant to be supplied into the polymerization reactor in the method is limited to such that it could prevent as much as possible the polymerization activity of the catalyst from being depressed in the reactor, and therefore it is extremely difficult to unify the action of the catalyst activity retardant on the catalyst in the polymerization reactor in view of the balance of the catalyst activity retardant supply to the reactor and the consumption of the retardant in the reactor.

On the basis of this knowledge, we, the present inventors have further studied the problem of how to more efficiently take advantage of the catalyst activity retardant in vapor-phase olefin polymerization, and, as a result, have found that, when the retardant is fed into the vapor phase in the polymerization reactor and also into the powder phase therein through its side wall, then it solves the problem of polymer deposition in reactors and the problem of formation of abnormal polymer agglomerates and aggregates in reactors. In particular, we have found that, when the retardant supply through the side wall of the polymerization reactor is effected through a plurality of openings in the side wall, preferably through those positioned in upper and lower parts of the reactor, more preferably through those spaced from each other in the peripheral direction of the side wall, then the retardant thus supplied into the reactor is more effective for solving the problems, though depending on the structure of the polymerization reactor used.

The catalyst activity retardant may be selected from alcohols, phenols, carboxylic acids, sulfonic acids, amines, amides, esters, ethers, phosphines, water, carbon monoxide and carbon dioxide. More preferably, the catalyst activity retardant is an active hydrogen-having compound.

The active hydrogen-having compound includes alcohols such as methanol, ethanol, n-propanol, isopropanol, n-butanol, t-butanol, n-hexanol; phenols such as phenol, cresol, xylenol; carboxylic acids such as formic acid, acetic acid, propionic acid, benzoic acid; sulfonic acids such as sulfonic acid, benzenesulfonic acid, toluenesulfonic acid; amines such as ethylamine, isopropylamine; and water. Of those active hydrogen-having compounds, more preferred are linear or branched alcohols having from 1 to 20 carbon atoms, preferably from 1 to 10 carbon atoms, such as methanol, ethanol, n-propanol and isopropanol. Two or more catalyst activity retardants may be combined for use herein.

The catalyst activity retardant may be fed alone into the polymerization reactor, but may be thereinto along with a carrier fluid of, for example, monomers, inert hydrocarbon solvents such as heptane, or hydrogen or nitrogen. Monomers are preferred for the carrier fluid, as they have the activity to cool the polymerization system and are effective for preventing polymer deposition in the reactor. The monomers may be either fresh ones or the ones circulated for removing the heat of polymerization.

Regarding the mode of feeding it into the polymerization reactor, it is desirable that drops of the catalyst activity retardant are fed thereinto through spray nozzles, as improving the uniformity of the reactant phase in the reactor. The retardant drops may have a size of from 10 $\mu$m to 5 mm, preferably from 50 $\mu$m to 2 mm. If their size is smaller than 10 $\mu$m, the drops will be carried by the monomer in the reactor; but if larger than 5 mm, they could not vaporize sufficiently, and therefore could not produce the effect of the invention.

The amount of the catalyst activity retardant to be fed into the polymerization reactor is determined in consideration of the polymer productivity and the object of the invention, and it varies, depending on the type of the retardant, the structure of the polymerization reactor, the presence or absence of a stirrer in the reactor, the type of the stirrer, the size including the height and the diameter of the reactor and the stirrer, the polymerization mode in the reactor, and the type of the catalyst used. In general, however, the amount of the catalyst activity retardant may fall between 0.001 and 5 g, preferably between 0.005 and 1 g per kg of the polyolefin produced, and between 0.001 and 10 mols, preferably between 0.005 and 5 mols per gram of aluminium in the catalyst used.

In the invention, it is a matter of great importance that the polymerization catalyst activity retardant such as alcohol is fed into specific sites of the polymerization reactor. Specifically, the retardant is fed into the vapor phase in the polymerization reactor in a continuous vapor-phase polymerization line, and into the powder phase in the reactor through its side wall. In other words, the catalyst activity retardant must be fed into at least two sites of the polymerization reactor. The side wall of the polymerization reactor referred to herein is meant to indicate the wall that constitutes the outer periphery of the body of the reactor, irrespective of the structure of the reactor as to whether it is a vertical one or a horizontal one and as to whether the shaft of the stirrer in the reactor stands vertical or horizontal. Accordingly, the side wall generally forms the vertical cylindrical body of a vertical polymerization reactor, and forms the horizontal cylindrical body of a horizontal polymerization reactor.

The ratio of the catalyst activity retardant to be fed into the vapor phase in the polymerization reactor to that into the powder phase therein through the side wall of the reactor falls between 95/5 and 10/90 by weight, more preferably between 90/10 and 30/70 by weight. The reason why the ratio of the catalyst activity retardant into the vapor phase is high is because the retardant fed into the vapor phase will vaporize in the vapor phase and, as a result, a considerable amount of the retardant will go out of the reactor along with the monomer into the monomer circulation line. Naturally, the catalyst activity retardant having been thus led into the monomer circulation line along with the monomer thereinto circulates through the line and again enters the polymerization reactor through its bottom, and acts therein as it is. Accordingly, it is desirable that the ratio of the catalyst activity retardant into the two zones is determined in consideration of the ratio of the retardant to be led into the monomer circulation line along with the monomer thereinto.

The site of the polymerization reactor through which the catalyst activity retardant is fed into the vapor phase therein is not specifically defined, so far as the retardant is fed into the vapor phase through it. As the case may be, therefore, the retardant may be fed into the polymer transfer line so as to be indirectly led into the vapor phase in the reactor.

In the invention, it is a matter of great importance that the catalyst activity retardant is fed into the vapor phase in the reactor, and in addition thereto, also into the powder phase therein through the side wall of the reactor. If not, or that is, if the retardant is fed into the reactor through its bottom only like conventionally, the excellent effect of the invention could not be attained. Preferably, the retardant is fed into the powder phase in the reactor through a plurality of sites of the side wall of the reactor, though depending on the structure of the reactor and on the condition of the powder phase in the reactor.

The plural sites of the side wall through which the retardant is fed into the powder phase may be determined, depending on the structure of the polymerization reactor, the height of the powder phase in the reactor, and the position of each site in the peripheral direction of the side wall. For example, when the height of the powder phase in the reactor is 1, the retardant may be fed into the powder phase through two sites of the side wall, one being at a height of $\frac{1}{3}$ and the other at a height of ⅔ from the bottom of the reactor. The retardant may be fed into the powder phase through at least one selected from two, three or four sites spaced from each other at about 180 degrees, 120 degrees or 90 degrees in the peripheral direction of the side wall.

In case where the catalyst activity retardant is fed into the powder phase in the reactor through a plurality of sites of the side wall that are spaced from each other in the height direction of the powder phase and in the peripheral direction of the side wall, the retardant can be efficiently and more uniformly dispersed in the powder-phase polymer. The effect is obvious from the data in Examples mentioned hereinunder. In the related art, it has heretofore been considered that the polymerization catalyst activity retardant fed into a polymerization reactor will generally vaporize and its uniformity will depend on the condition of the mixture of the retardant vapor and the polymer powder. Therefore, no one has ever paid any specific attention to the problem of the uniformity of the catalyst activity retardant in the polymerization reactor. However, some specific phenomenon beyond common knowledge in the art might have occurred in the polymerization reactor in that condition.

Specifically, we, the present inventors have found through our studies that, when a catalyst activity retardant is fed into the powder phase in a polymerization reactor through its side wall, then its effect is extremely high even though its amount is small. Though not clear, the reason will be because the catalyst activity retardant fed into the reactor in such a specific manner may be uniformly dispersed in the powder phase by some favorable action around the boundary between the side wall of the reactor and the powder phase in the reactor.

Accordingly, in the invention, it is believed that the catalyst activity retardant fed into the polymerization reactor will unify the activity of the catalyst in the polymerization system, especially in the polymerization reactor, to thereby prevent the polymer from being agglomerated or aggregated and prevent the polymer from depositing on the wall of the polymerization reactor and on the stirring blades, and, as a result, the formation of large polymer grains and the formation of abnormal polymer agglomerates or aggregates (these cause the formation of polymer gels) will be thereby significantly reduced to attain the object of the invention of long-term, continuous and stable production of polyolefins.

The polyolefin production method of the invention is favorable to production of block polyolefins through multi-stage polymerization which comprises producing a crystalline polypropylene of either a propylene homopolymer or a propylene copolymer having an additional α-olefin content of at most 5% by weight in a first polymerization reactor, and producing a propylene block copolymer through random copolymerization of propylene and an α-olefin different from propylene in the presence of the crystalline polypropylene in a second polymerization reactor, and in which a catalyst activity retardant is fed into the second polymerization reactor.

The invention also provides a vapor-phase polymerization apparatus for the polyolefin production method, which comprises a monomer supply line, a polymer take-out line, a monomer circulation line, and a polymerization reactor optionally with a stirrer therein, and which is equipped with a supply unit for feeding a catalyst activity retardant into the vapor phase in the polymerization reactor and into the powder phase therein through its side wall. In the apparatus, the catalyst activity retardant supply unit may have a plurality of outlets that are directed to the powder phase in the polymerization reactor and are spaced from each other in the peripheral direction of the side wall of the reactor.

One example of the polymerization apparatus for the polyolefin production method of the invention is described in detail hereinunder. This is for producing propylene block copolymers.

The method of producing propylene block copolymers comprises producing a crystalline polypropylene resin of either a propylene homopolymer or a propylene copolymer with any other α-olefin such as ethylene or 1-butene having an additional α-olefin content of at most 5% by weight in a former-stage vapor-phase polymerization reactor in the presence of a stereospecific catalyst therein, then transferring the crystalline polypropylene resin into a latter-stage polymerization reactor, and producing a propylene block copolymer through rubber-like random copolymerization of propylene and an α-olefin different from propylene such as ethylene, in the presence of the crystalline polypropylene in the latter-stage polymerization reactor.

The process produces a propylene block copolymer comprising a continuous phase of crystalline polypropylene and a dispersed phase of rubber-like polymer particles (including polyethylene) and having high impact strength, especially high low-temperature impact strength. In this, any type of block polypropylene copolymers having desired properties can be produced by controlling the copolymerization composition of the random copolymer to be therein and the molecular weight of the random copolymer and by controlling the random copolymer content of the block copolymer.

The monomers for the random copolymer to be produced in the latter-stage polymerization reactor are a combination of propylene and any other α-olefin such as ethylene or 1-butene. The copolymerization ratio by weight of propylene to the other α-olefin may fall between 10/90 and 90/10, preferably between 20/85 and 80/15. The content of the random copolymer that is produced in the latter-stage random copolymerization and is in the propylene block copolymer falls between 3 and 60% by weight, preferably between 5 and 50% by weight.

A method for producing such propylene block copolymers, which is one example of the polyolefin production method of the invention, is described with reference to the drawing of a vapor-phase polymerization apparatus attached hereto. FIG. 1 is a schematic view of one example of the apparatus for polyolefin production of the invention. In FIG. 1, 1 is a former-stage polymerization reactor; 2 is a latter-stage polymerization reactor; 3 is a stirrer in the former-stage polymerization reactor; 4 is a stirrer in the latter-stage polymerization reactor; 5 is a circulation line fitted to the former-stage polymerization reactor; 6 is a circulation line fitted to the latter-stage polymerization reactor; 7 and 8 are filters; 9 and 10 are compressors; 11 and 12 are condensers; 13 and 14 are pumps; 15 is a monomer supply line; 16 is a polymer transfer line; 17 is a polymer take-out line; 18 is a powder phase in the former-stage polymerization reactor; 19 is a vapor phase in the former-stage polymerization reactor; 20 is a powder phase in the latter-stage polymerization reactor; 21 is a vapor phase in the latter-stage polymerization reactor; and 22 is a catalyst activity retardant supply line.

One example of the polymerization catalyst usable in the embodiment illustrated is a high-stereospecificity catalyst obtained from (A) a solid catalyst component containing at least magnesium, titanium and halogen atoms, and (B) an organoaluminium compound. For example, the high-stereospecificity catalyst may comprise the following components (A) and (B).

(A) A solid catalyst component obtained from (a) a magnesium compound and (b) a titanium compound, and
(B) an organoaluminium compound.

Preferably, the high-stereospecificity catalyst for use herein comprises the following components (A), (B) and (C).
(A) A solid catalyst component obtained from (a) a magnesium compound and (b) a titanium compound,
(B) an organoaluminium compound, and
(C) an electron donor.

The compounds to constitute the catalyst are mentioned below.

(a) Magnesium Compound

The magnesium compound is not specifically defined, including, for example, magnesium oxide, magnesium hydroxide, dialkylmagnesiums, alkylmagnesium halides, magnesium halides, and magnesium dialkoxides. Concretely, they are magnesium chloride, magnesium diethoxide, and magnesium dimethoxide. Preferably, the magnesium compound is a known solid product obtained by reacting metal magnesium with a halogen and an alcohol. The alcohol includes methanol and ethanol, and its water content is preferably at most 200 ppm as readily producing a solid product of good morphology. The halogen includes chlorine, bromine and iodine; and iodine is preferred.

(b) Titanium Compound

The titanium compound may be any and every one, for example, represented by a general formula (1):

$$TiX^1_n(OR^1)_{4-n} \tag{1}$$

wherein $X^1$ represents a halogen atom, preferably a chlorine atom; $R^1$ represents a hydrocarbon group having from 1 to 10 carbon atoms, preferably a linear or branched alkyl group, and a plurality of $R^1$'s, if any, may be the same or different; n is an integer falling between 0 and 4.

Concretely, it includes $Ti(O-i-C_3H_7)_4$, $Ti(O-C_4H_9)_4$, $TiCl(O-C_2H_5)_3$, $TiCl(O-i-C_3H_7)_3$, $TiCl(O-C_4H_9)_3$, $TiCl_2(O-C_4H_9)_2$, $TiCl_2(O-i-C_3H_7)_2$, and $TiCl_4$.

(c) Electron Donor

The solid catalyst component (A) may optionally contain an electron donor (c). In general, the electron donor is an organic compound containing oxygen, nitrogen, phosphorus or sulfur. Concretely, it includes amines, amides, ketones, nitrites, phosphines, esters, ethers, thioethers, alcohols, thioesters, acid anhydrides, acid halides, aldehydes, organic acids, organosilicon compounds with Si—O—C bond.

Preferred examples of the electron donor are aromatic diphthalates such as diethyl phthalate, dibutyl phthalate, diisobutyl phthalate, dihexyl phthalate; and organosilicon compounds such as dimethyldimethoxysilane, diethyldiethoxysilane, diphenyldimethoxysilane, cyclohexylmethyldimethoxysilane, di-t-butyldimethoxysilane, diisobutyldimethoxysilane, diisopropyldimethoxysilane, dicyclohexyldimethoxysilane, dicyclopentyldimethoxysilane.

Method for Preparing Solid Catalyst Component (A)

The solid catalyst component (A) may be prepared from a magnesium compound (a), a titanium compound (b), and optionally an electron donor (c) in any known manner. For example, a magnesium compound (a) is contacted with an electron donor (c), and then with a titanium compound (b). The condition for the contact treatment is not specifically defined. In general, from 0.01 to 10 mols, preferably from 0.05 to 5 mols of an electron donor (c) is added to and contacted with one mol, in terms of the magnesium atom, of a magnesium compound (a), at 0 to 200° C. for 5 minutes to 10 hours, preferably at 30 to 150° C. for 30 minutes to 3 hours. When the two are contacted with each other, an inert hydrocarbon such as pentane, hexane or heptane may be added thereto.

The condition for applying a titanium compound (b) to the magnesium compound (a) or its contact product with an electron donor (c) is not also specifically defined. In general, from 1 to 50 mols, preferably from 2 to 20 mols of a titanium compound (b) is added to and contacted with one mol of magnesium at 0 to 200° C. for 5 minutes to 10 hours, preferably at 30 to 150° C. for 30 minutes to 5 hours. For the contact treatment with it, a liquid titanium compound (for example, titanium tetrachloride) may be used alone, but other titanium compounds are used after having been dissolved in any desired inert hydrocarbon. Before optionally contacted with an electron donor (c), the magnesium compound (a) may be contacted with any of, for example, halogenohydrocarbons, halogen-containing silicon compounds, halogen gas, hydrogen chloride or hydrogen iodide. After the contact treatment, the product is preferably washed with an inert hydrocarbon.

(B) Organoaluminium Compound

The organoaluminium compound (B) is not specifically defined, and is, for example, represented by the following general formula (2):

$$AlR^2_m X^2_{3-m} \tag{2}$$

wherein $R^2$ represents an alkyl, cycloalkyl or aryl group having from 1 to 10 carbon atoms; m is an integer of from 1 to 3; $X^2$ represents a halogen atom (chlorine or bromine atom). Concretely, it includes trialkylaluminium compounds such as trimethylaluminium, triethylaluminium, triisopropylaluminium, triisobutylaluminium; and dialkylaluminium monochlorides such as diethylaluminium monochloride, diisopropylaluminium monochloride.

(C) Electron Donor

In producing block polypropylenes, optionally used is an electron donor (C). The electron donor (C) may be of the same type as that of the electron donor (c) used in preparing the solid catalyst component (A). It may be the same as or may differ from that used in preparing the solid catalyst component. Preferably, the electron donor (C) is a silane compound with SiO—C bond, more preferably that of the following formula (3):

$$R^3_p Si(OR^4)_{4-p} \tag{3}$$

wherein $R^3$ represents a linear or branched hydrocarbon group, an aromatic hydrocarbon group, or a cyclic saturated hydrocarbon group, and when $p \geq 2$, $R^3$'s may be in any combination of the groups; $R^4$ represents a linear hydrocarbon group, or a branched-chain hydrocarbon group; and p is an integer of from 0 to 3. Specific examples of the compound of formula (3) are t-butylcyclohexyldimethoxysilane, methylcyclohexyldimethoxysilane, di-t-butyldimethoxysilane, dicyclohexyldimethoxysilane, diphenyldimethoxysilane, dimethyldiethoxysilane, trimethylethoxysilane, methylphenyldimethoxysilane.

For producing a propylene block copolymer according to the polyolefin production method of the invention, propylene is fed into the former-stage polymerization reactor 1 through the monomer supply line 15, as in FIG. 1, and a solid catalyst is fed thereinto through a catalyst supply line (not shown). In the reactor 1, these are stirred with the stirrer 3, and propylene is continuously polymerized into a crystalline polypropylene. In the process of producing a propylene block copolymer, the former-stage reaction may be effected in a multi-stage polymerization reactor. In this, if desired, the catalyst may be contacted with a small amount of monomer such as propylene for pre-polymerization prior to polymerization with it. This is for improving the activity of the catalyst, for increasing the bulk density of the polymer to be produced, and for improving the flowability of the polymer particles.

In the reaction in the former-stage polymerization reactor, for example, the polymerization temperature falls between 40 and 100° C., preferably between 50 and 90° C., and the polymerization pressure falls between 0.1 and 10 MPa or so. Hydrogen may be introduced into the former-stage reactor for so controlling the molecular weight of the polymer produced therein that the intrinsic viscosity [η] thereof, measured at 135° C. in tetralin, may fall between 1 and 10 dl/g or so, preferably between 1 and 6 dl/g or so. The heat of reaction in the former-stage polymerization reactor 3 is removed by circulating the propylene monomer through the circulation line 5 via the filter 7, liquefying it in the compressor 9 and the condenser 11, and jetting the thus-liquefied monomer into the reactor 3, in which the reaction system is therefore cooled by the heat of vaporization of the liquid monomer. The polymer particles produced through the polymerization in the former-stage reactor are stirred by the stirrer therein to give a powder layer, and are separated into a powder phase 18 and a vapor phase 19 in the former-stage reactor. The polymer articles of the powder phase 18 are then transferred into the latter-stage polymerization reactor 2 through the polymer transfer line 16.

In the latter-stage polymerization reactor 2, propylene and an α-olefin different from propylene fed thereinto through supply lines (not shown) are reacted in the presence of the powder-phase crystalline polypropylene particles having been transferred thereinto from the former-stage polymerization reactor, while they are stirred by the stirrer 4 in the same manner as previously, and are polymerized to give a random copolymer. Combined with the crystalline polypropylene fed from the former-stage reactor, this forms a propylene block copolymer composition. The thus-formed propylene block copolymer composition is continuously taken out through the polymer take-out line 17. The copolymerization condition in the latter-stage reactor may be substantially the same as the polymerization condition in the former-stage reactor. The copolymerization ratio in the latter-stage reactor is as described hereinabove. The heat of polymerization in the latter-stage reactor is removed by circulating the mixed monomer of propylene and other α-olefin, through the circulation line 6 via the filter 8, the compressor 10, the condenser 12 and the pump 14.

In this embodiment of the invention illustrated in FIG. 1, a catalyst activity retardant, concretely, an active hydrogen compound such as an alcohol, e.g., ethanol or isopropyl alcohol is fed into the latter-stage polymerization system through the supply line 22. Regarding the supply mode through the line 22, the catalyst activity retardant is fed into the vapor phase 21 in the reactor 2 through the site A, and into the powder phase 20 therein through at least one site of B, C and D of the side wall of the reactor.

Accordingly, the catalyst activity retardant is fed into the latter-stage reactor through the retardant supply 22, for example, through the branches to A, B, C and D illustrated (switch valves and flow rate control valves are not shown). To the retardant supply line 22, connected is a carrier fluid supply line (not shown) for propylene monomer, etc. If the catalyst activity retardant is fed into the reactor all via one site of the reactor, it could not attain the object of the invention. A predetermined amount of the catalyst activity retardant is fed into the reactor via two sites, one to the vapor phase 21 and the other to the powder phase 20, and its supply to the powder phase 20 is through the opening in the side wall of the reactor. Only when the supply of the catalyst activity retardant to the powder phase in the reactor is effected through the opening in the side wall of the reactor, the object of the invention can be attained.

In particular, the retardant is fed into the powder phase in the reactor through a plurality of sites of the side wall, for example, through B and C, or C and D, or B and D, or B, C and D. In this case where the retardant is fed into the powder phase through such a plurality of sites of the side wall, it is desirable that the supply sites are in the upper and lower parts of the powder phase, as so mentioned hereinabove, for example, in B and C, or in B and D, or that is, the supply sites are spaced from each other in the vertical direction or in the peripheral direction (in the illustrated case, the two sites are spaced from each other in the peripheral direction at 180 degrees). Regarding the supply ratio of the catalyst activity retardant to the vapor phase to that to the powder phase, it is desirable that the retardant supply to the vapor phase is larger than that to the powder phase, as so mentioned hereinabove.

Though not clear, the reason why the specific supply mode of the catalyst activity retardant to the powder phase via the side wall of the reactor significantly contributes toward attaining the object of the invention will be because of some delicate synergistic effect of the uniform dispersion and the life of the catalyst activity retardant fed into the powder phase in such a specific supply mode. Accordingly, the technical idea and the constitution of the invention that has brought about the extremely excellent effect to attain the object of the invention basically differ from those of the related art technique of merely feeding a catalyst activity retardant to the polymerization system with no specific limitation.

In the invention, the retardant supply mode through a plurality of sites of the side wall of a reactor and the condition for the retardant supply through each site are not specifically defined, so far as they satisfy the requirements in the above-mentioned invention (1). For example, the retardant supply may be through the nozzles mentioned hereinabove.

The invention is described in more detail with reference to the following Examples.

EXAMPLE 1

Production of Propylene Block Copolymer (1) Production of Magnesium Compound (a)

Glass reactor (volume: about 12 liters) equipped with a stirrer was fully purged with nitrogen gas, and about 4860 g of ethanol, 32 g of iodine and 320 g of metal magnesium were put into it. With stirring, these were reacted under heat for reflux until no hydrogen gas formed in the system. Thus was obtained a solid reaction product. This was dried under reduced pressure to be a magnesium compound [solid product] (a).

(2) Preparation of Solid Catalyst Component (A)

160 g of non-ground magnesium compound (a) obtained in the above, 800 ml of pure heptane, 24 ml of silicon tetrachloride and 23 ml of diethyl phthalate were put into a three-neck glass flask (volume: 5 liters) that had been fully purged with nitrogen gas. While they were stirred at 90° C., 770 ml of titanium tetrachloride was added thereto, and reacted at 110° C. for 2 hours. The resulting solid component was separated, and washed with pure heptane at 80° C. 1220 ml of titanium tetrachloride was further added thereto, reacted at 110° C. for 2 hours, and then fully washed with pure heptane. The resulting product is solid catalyst component (A).

(3) Polymerization
<1> Pre-treatment 230 ml of n-heptane was put into a 500-ml reactor equipped with a stirrer, to which were added 25 kg of the solid catalyst component (A), 0.6 mols, per gram of the Ti atom in the solid catalyst component (A), of triethylaluminium, and 0.4 mols, per gram of the Ti atom in the solid catalyst component (A), of diphenyldimethoxysilane. Then, propylene was fed into it to have a propylene partial pressure of 0.03 MPa (gauge), and reacted at 55° C. for 4 hours. After the reaction, the solid catalyst component was washed a few times with n-heptane, and carbon oxide was applied thereto with stirring for 24 hours.

<2> Polymerization

To a former-stage polymerization reactor (for homopolymerization) having a capacity of 200 ml and equipped with a stirrer, fed were 3 mmols/hr, in terms of the Ti atom, of the pre-treated solid catalyst component, 600 mmols/hr of triethylaluminium, and 15 mmol/hr of diphenyldimethoxysilane. With that, propylene was introduced into the reactor and polymerized at a temperature of 70° C. and at a propylene pressure of 2.7 MPa (Gauge). In this step, hydrogen was introduced into the reactor to thereby control the molecular weight of the polymer to a predetermined one. Then, the polymer powder was continuously taken out of the former-stage reactor, and transferred into a latter-stage reactor (for random copolymerization). In the latter-stage reactor, propylene and ethylene fed thereinto were random-copolymerized at a temperature of 55° C. In this step, the supply ratio of propylene and ethylene was so controlled that the random copolymer produced could have a predetermined ethylene content.

In this step, ethanol was fed both into the vapor phase and into the powder phase in the latter-stage polymerization reactor (for random copolymerization) in the ratio by weight as in Table 1. The total supply of ethanol into the reactor was 700 ml/hr (ethanol was diluted to 2000 times with propylene) For this, referred to is FIG. 1. The total supply of ethanol corresponds to a ratio (by mol), ethanol/organoaluminium compound, of 1.17/1 (mol/mol). This corresponds to 0.1 g per kg of the polymer produced.

Regarding its supply mode into the later-stage polymerization reactor, ethanol was fed into the vapor phase in the reactor through a nozzle directed to the site (A) of the upper side wall of the reactor, and into the powder phase therein through two nozzles separately directed to the upper site (B) and the lower site (C), or to the upper site (B) and the opposite site (D) (this is spaced from (B) at 180 degrees) of the side wall of the reactor. The position of the upper nozzle directed to the powder phase was at a height of about ⅔ of the powder phase from the bottom of the reactor; and the position of the lower nozzles also directed thereto was at a height of about ⅓ of the powder phase from the bottom of the reactor.

The propylene block copolymer particles thus produced were continuously taken out of the latter-stage polymerization reactor. In the condition defined herein, the propylene block copolymer production was continued for 3 weeks while the polymerization line was monitored as to how many times the polymer take-out line was clogged and how many times the filters in the line were exchanged. After the production test in the line, the random polymerization reactor was opened, and the weight of the deposits on the wall of the reactor and on the stirring blades was metered. The results are given in Table 1.

EXAMPLE 2

In the same manner as in Example 1, a propylene block copolymer was produced. In this, however, the ethanol supply condition was changed as in Table 1. The results are given in Table 1.

EXAMPLE 3

In the same manner as in Example 1, a propylene block copolymer was produced. In this, however, the ethanol supply condition was changed as in Table 1. The results are given in Table 1.

Comparative Example 1

In the same manner as in Example 1, a propylene block copolymer was produced. In this, however, ethanol was fed only into a part of the monomer-cooling circulation line adjacent to its inlet into the polymerization reactor. The ethanol amount supplied is the same as in Example 1. The results are given in Table 1.

Comparative Example 2

In the same manner as in Example 1, a propylene block copolymer was produced. In this, however, ethanol was fed only into the polymer transfer line extending from the first polymerization reactor. The ethanol amount supplied is the same as in Example 1. The results are given in Table 1.

Comparative Example 3

In the same manner as in Example 1, a propylene block copolymer was produced. In this, however, ethanol was fed into two sites of the line in a ratio of 1/1, or that is, a half of it was fed into a part of the monomer-cooling circulation line adjacent to its inlet into the polymerization reactor, and another half thereof was into the polymer transfer line extending from the first polymerization reactor. The total ethanol supply is the same as in Example 1. The results are given in Table 1.

TABLE 1

| | | Example 1 | Example 2 | Example 3 | Comp. Ex. 1 | Comp. Ex. 2 | Comp. Ex. 3 |
|---|---|---|---|---|---|---|---|
| Ethanol Supply Sites, and Ethanol Supply Ratio - See FIG. 1 | Monomer-cooling Circulation Line | — | — | — | 10 | — | 5 |
| | Polymer Transfer Line | — | — | — | — | 10 | 5 |
| | Vapor Phase (A) in Reactor | 8 | 7 | 8 | — | — | — |
| | Upper Powder Phase (B) in Reactor | 1 | 1 | 1 | — | — | — |
| | Lower Powder Phase (C) in Reactor | 1 | 2 | — | — | — | — |
| | Lower Powder Phase (C) opposite to (B) in Reactor | — | — | 1 | — | — | — |

TABLE 1-continued

| | Example 1 | Example 2 | Example 3 | Comp. Ex. 1 | Comp. Ex. 2 | Comp. Ex. 3 |
|---|---|---|---|---|---|---|
| Frequency of Clogging of Polymer Take-out Line (times/day) | 2 | 0 | 0 | 67 | 30 | 30 |
| Frequency of Filer Exchange (times/3 weeks) | 0 | 0 | 0 | 7 | 2 | 4 |
| Total Amount of Deposits (kg/3 weeks) | 1.3 | 0.8 | 0.2 | 13.0 | 11.0 | 10.0 |
| Details of Deposits  wall around vapor phase in reactor (kg/3 weeks) | 0 | 0 | 0 | 5.6 | 5.0 | 5.0 |
| stirring blades (kg/3 weeks) | 1.3 | 0.8 | 0.2 | 7.4 | 6.0 | 5.0 |

Industrial Applicability

According to the invention, the polymer produced is prevented from depositing on the wall of reactors and on stirring blades and is prevented from growing into agglomerates and aggregates, and the polymer take-out line is prevented from being clogged. Therefore, in the polymer production method of the invention, the frequency for filter exchange in the monomer-cooling circulation line is reduced, and the method enables long-term continuous production of polyolefins. According to the method, the polymer productivity increases, and the production costs can be reduced. In addition, since the polymer deposition in reactors is greatly reduced and the amount of abnormal polymer agglomerates and aggregates is also greatly reduced in the method of the invention, the polymers produced are not contaminated with such abnormal polymer agglomerates and aggregates (including gels). Therefore, the polymer products of the invention do not contain insoluble solids, and have good quality, or that is, their outward appearance and physical properties are good. Accordingly, the invention is favorable to propylene block copolymer production, especially to latter-stage reactors for random copolymerization to produce rubber-like, sticky propylene-ethylene random copolymers.

What is claimed is:

1. A method for producing a polyolefin through continuous vapor-phase polymerization in the presence of an olefin polymerization catalyst, said method comprising feeding a catalyst activity retardant into a vapor phase and a powder phase in a polymerization reactor, wherein the catalyst activity retarder is fed into the polymerization reactor through a side wall.

2. The method for producing polyolefins as claimed in claim 1, wherein the catalyst activity retardant is fed into the powder phase through a plurality of openings in the side wall of the polymerization reactor.

3. The method for producing a polyolefin as claimed in claim 2, wherein the plurality of openings in the side wall of the polymerization reactor through which the catalyst activity retardant is fed into the powder phase are in the upper and lower parts of the reactor and are spaced from each other in the peripheral direction of the side wall.

4. The method for producing a polyolefin as claimed in claim 1, wherein the amount of the catalyst activity retardant fed into the polymerization reactor falls between 0.001 and 5 g per kg of a polyolefin produced, and a ratio of the catalyst activity retardant fed into the vapor phase in the reactor to the catalyst activity retardant fed into the powder phase falls between 95/5 and 10/90 by weight.

5. The method for producing a polyolefin as claimed in claim 1, wherein the catalyst activity retardant is fed into the polymerization reactor along with a carrier fluid.

6. The method for producing a polyolefin as claimed in claim 1, wherein the catalyst activity retardant is at least one selected from the group consisting of alcohols, phenols, carboxylic acids, sulfonic acids, amines, amides, esters, ethers, phosphines, water, carbon monoxide and carbon dioxide.

7. The method for producing a polyolefin as claimed in claim 1, wherein the catalyst activity retardant is an active hydrogen-containing compound.

8. The method for producing a polyolefin as claimed in claim 1, further comprising producing a crystalline polypropylene of either a propylene homopolymer or a propylene copolymer having an additional α-olefin content of at most 5% by weight in a first polymerization reactor, and producing a propylene block copolymer through random copolymerization of propylene and an α-olefin different from propylene in the presence of the crystalline polypropylene in a second polymerization reactor, wherein the catalyst activity retardant is fed into the second polymerization reactor.

9. A vapor-phase polymerization apparatus for polyolefins, which comprises a monomer supply line, a polymer take-out line, a monomer circulation line, and a polymerization reactor optionally with a stirrer therein, wherein said vapor phase polymerization apparatus is equipped with a supply unit for feeding a catalyst activity retardant into a vapor phase in an upper part of the polymerization reactor, above the surface of a powder phase, and into the powder phase therein through its side wall.

10. The vapor-phase polymerization apparatus for polyolefins as claimed in claim 9, wherein the catalyst activity retardant supply unit has a plurality of outlets that are directed to the powder phase in the polymerization reactor and are spaced from each other in the peripheral direction of the side wall of the reactor.

11. The method for producing a polyolefin as claimed in claim 2, wherein the amount of the catalyst activity retardant fed into the polymerization reactor falls between 0.001 and 5 g per kg of a polyolefin produced, and a ratio of the catalyst activity retardant fed into the vapor phase in the reactor to the catalyst activity retardant fed into the powder phase falls between 95/5 and 10/90 by weight.

12. The method for producing a polyolefin as claimed in claim 4, wherein the catalyst activity retardant is fed into the polymerization reactor along with a carrier fluid.

13. The method for producing a polyolefin as claimed in claim 4, wherein the catalyst activity retardant is at least one selected from the group consisting of alcohols, phenols, carboxylic acids, sulfonic acids, amines, amides, esters, ethers, phosphines, water, carbon monoxide and carbon dioxide.

14. The method for producing a polyolefin as claimed in claim 4, wherein the catalyst activity retardant is an active hydrogen-containing compound.

15. The method for producing a polyolefin as claimed in claim 4, further comprising producing a crystalline polypropylene of either a propylene homopolymer or a propylene copolymer having an additional α-olefin content of at most 5% by weight in a first polymerization reactor, and producing a propylene block copolymer through random copolymerization of propylene and an α-olefin different from propylene in the presence of the crystalline polypropylene in a second polymerization reactor, wherein the catalyst activity retardant is fed into the second polymerization reactor.

* * * * *